United States Patent
Knotek et al.

[11] 4,228,223
[45] Oct. 14, 1980

[54] WEAR AND CORROSION RESISTANT NICKEL-BASE ALLOY

[75] Inventors: Otto Knotek, Aachen, Fed. Rep. of Germany; Erich Lugscheider, Vaals, Netherlands; Wolfgang Wichert, Aachen, Fed. Rep. of Germany

[73] Assignee: Eutectic Corporation, Flushing, N.Y.

[21] Appl. No.: 882,356

[22] Filed: Mar. 1, 1978

Related U.S. Application Data

[62] Division of Ser. No. 784,376, Apr. 4, 1977, Pat. No. 4,118,254.

[51] Int. Cl.$^2$ ............................................. B22F 7/04
[52] U.S. Cl. ............................. 428/558; 219/146.41; 219/146.51
[58] Field of Search .................. 428/558; 219/146.41, 219/146.51

[56] References Cited
U.S. PATENT DOCUMENTS

| | | | |
|---|---|---|---|
| 2,756,492 | 7/1956 | Pettibone | 428/558 |
| 2,862,844 | 12/1958 | Luedeman | 428/558 |
| 2,888,740 | 6/1959 | Danis | 428/558 |
| 3,603,763 | 9/1971 | Juzvenko | 219/146.51 |
| 3,855,447 | 12/1974 | Kilp | 219/146.51 |

*Primary Examiner*—Brooks H. Hunt
*Attorney, Agent, or Firm*—Hopgood, Calimafde, Kalil, Blaustein and Lieberman

[57] ABSTRACT

A nickel-base wear and corrosion resistant alloy is provided containing by weight about 20% to 35% Cr, about 1% to 8% Si, about 1.7% to 3.5% C, 0 to 15% W and the balance essentially at least about 40% nickel, the amount of carbon present in said composition being stoichiometrically related to the chromium content to provide carbides based on the formula $M_7C_3$, wherein M comprises essentially chromium, the amount of chromium in said $M_7C_3$ compound ranging from about 65% to less than about 100% of the total chromium in said composition, the melting point of said alloy being less than about 1350° C. The alloy has particular use in welding consumables for hard facing, for valve seats, for wear resistant sleeves and bushings (castings) and other uses.

3 Claims, 5 Drawing Figures

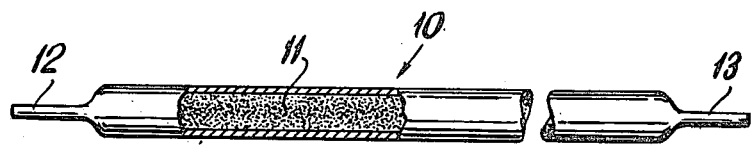
FIG. 1
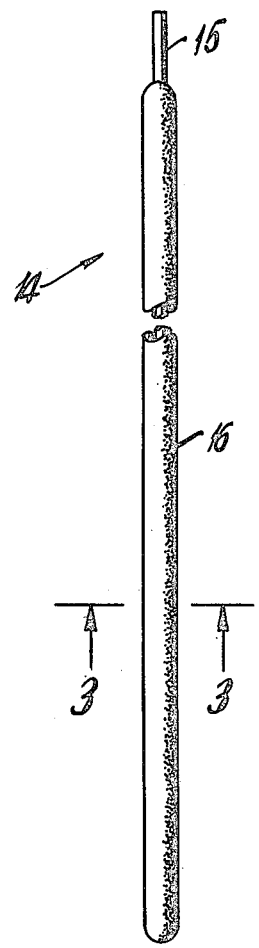
FIG. 2
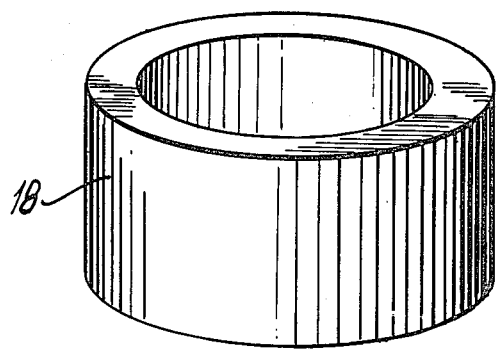
FIG. 4
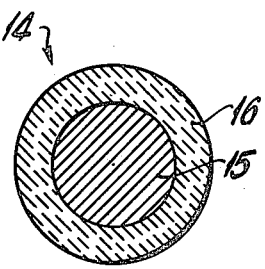
FIG. 3
FIG. 5

WEAR AND CORROSION RESISTANT NICKEL-BASE ALLOY

This is a division of copending application Ser. No. 784,376, filed Apr. 4, 1977, now U.S. Pat. No. 4,118,254.

This invention relates to a wear resistant and corrosion resistant nickel-base alloy and to articles of manufacture made of said alloy, such as welding consumables, P/M (powder metallurgy) preforms for producing hard surface elements on metal substrates, e.g. valve seats, and wear and corrosion resistant castings, and the like.

STATE OF THE ART

Wear and corrosion resistant alloys are known for hard facing metal substrates, for valve seats, and for the production of wear resistant castings, among other uses.

A known wear resistant composition is a cobalt-base alloy containing by weight 0.9–1.6% C, 0.5% Mn max, 0.8–1.5% Si, 26–29% Cr, 4–6% W, 2% max Fe and the balance cobalt. This alloy has been recommended for applications involving room and high temperature abrasive action, galling in metal-to-metal wear, and a moderate degree of impact, thermal shock or stress loading. The foregoing alloy generally exhibits a hardness ranging from about 40 to 49 Rockwell C.

Another known composition is a nickel-base alloy containing by weight 0.25–0.75% C, 3 to 5% Si, 10 to 15% Cr, 3 to 5% Fe, 1.5 to 4% B, 0.2% Co max and the balance at least 77% nickel. This alloy is particularly adapted for producing centrifugally cast shapes, exhibits a hardness of about 42 to 52 Rockwell C and has a melting point of about 1065° C. (1950° F.). The alloy is preferably cobalt-free (e.g. not exceeding 0.2% Co by weight) where the danger of radioactive contamination exits, such as in equipment employed in nuclear power applications. This alloy is suggested for liners, thrust shoes, bushings and other valve components for nuclear applications.

Another known wear resistant cobalt-base alloy is a composition containing by weight 1.8–2.2% C, 0.5–1% Mn, 0.8–1.5% Si, 30–33% Cr, 3% max Ni, 11–13% W, 2% max Fe and the balance cobalt. The hardness of this alloy may range from about 54 to 58 Rockwell C.

A problem which arises in the production of hard face coatings and/or cast shapes using complex wear and corrosion resistant alloys, such as high chromium, high carbon nickel-base alloys, is the tendency of such alloys in the molten state to segregate on freezing due to the relatively large liquidus-solidus temperature range over which solidification occurs. This is particularly important in the production of castings for wear resistant applications in which the surface hardness of a bushing, a sleeve, etc., is important.

We have found that we can provide a nickel-base alloy in which the solidus-liquidus temperature range of the alloy system is narrow and thereby minimizes the amount of segregation of the alloy during freezing from the liquid to the solid state.

OBJECTS OF THE INVENTION

It is thus an object of the invention to provide a high chromium-containing, high carbon-containing nickel-base alloy characterized by resistance to wear and corrosion and by high hardness.

Another object is to provide a welding consumable formed of a high chromium-containing, high carbon-containing nickel-base alloy, a deposit produced from said welding consumable being characterized by resistance to wear and corrosion.

A further object of the invention is to provide as an article of manufacture a wear and corrosion resistant coating made of a high chromium-containing and high carbon-containing nickel-base alloy.

A still further object of the invention is to provide a powder composition of a high chromium-containing, high carbon-containing nickel-base alloy.

These and other objects will more clearly appear when taken in conjunction with the following disclosure, the appended claims and the following drawing, wherein:

FIGS. 1 to 3 are illustrative of several embodiments of welding consumables employing the alloy composition of the invention;

FIG. 4 depicts a P/M (powder metallurgy) preform in the form of an annular shape having particular use in forming a valve seat surface on the surface of a valve part; and FIG. 5 is illustrative of a machined cast bushing or sleeve produced from the alloy of the invention.

STATEMENT OF THE INVENTION

One embodiment of the invention is directed to a nickel-base wear and corrosion resistant alloy containing by weight about 20% to 35% Cr, about 1% to 8% Si, about 1.7% to 3.5% C, 0 to 15% W and the balance essentially 40% nickel, the amount of carbon present in said composition being stoichiometrically related to the chromium content to provide carbides based on the formula $M_7C_3$, wherein M comprises essentially chromium, the amount of chromium in said $M_7C_3$ carbide ranging from about 65% to less than 100% of the total chromium in the composition, the melting point of said composition being less than about 1350° C.

Alloys produced from the foregoing composition are characterized by high hardness ranging from about 35 to 55 Rockwell C. The alloy is rendered particularly acid resistant by the presence of at least one additional metal selected from the group consisting of up to about 5% copper (preferably about 1% to 4% Cu) and up to about 5% molybdenum (preferably about 1% to 4% Mo) and the balance essentially at least about 50% nickel.

By having a major amount of the chromium in the composition tied up as $M_7C_3$, an alloy composition is provided having a relatively narrow melting range which aids in minimizing segregation of the alloy during solidification, either as a casting, as a weld deposit, or as a coating on a metal substrate.

While the $M_7C_3$ compound comprises essentially chromium carbide, that is, about 65% to less than 100% of the total chromium present, small amounts of other metals may be present in the compound to provide variations thereof, such as $(CrW)_7C_3$, $(CrNi)_7C_3$ or $(CrWNi)_7C_3$. Thus, reference to $M_7C_3$ in the disclosure is meant to include the foregoing variations of the carbide in which chromium is an essential ingredient, the amount of chromium comprising at least 65% of the total chromium content of the alloy composition and ranging up to less than about 100%, preferably between 75% and 100% of the total chromium content.

As will be appreciated, according to the law of mass action, some of the chromium will enter the nickel matrix and form a solid solution therewith and confer resistance to corrosion to the final alloy, the remainder of the chromium (at least 65%), forming the compound $M_7C_3$.

The foregoing alloy is particularly useful for forming welding consumables, alloy spray powder for producing hard facing coatings, P/M preforms for use in the production of wear resistant valve seats and wear and abrasion resistant castings, such as sleeves, bushings, wear rings, grooving rolls and the like.

As illustrative of welding consumables, reference is made to FIGS. 1 to 3, FIG. 1 being a tubular welding rod of the type disclosed in U.S. Pat. No. 3,033,977, said patent being incorporated herein by reference. The weld rod comprises a metal tube of nickel of relatively small diameter with a metallic powder therein of a composition taken with the nickel tube to produce by reaction a weld deposit consisting essentially by weight of above 20% to 35% Cr, about 1% to 8% Si, about 1.7% to 3.5% C, 0 to 15% W and the balance essentially at least about 40% and preferably at least about 50% nickel. As stated hereinabove, the amount of carbon within the foregoing range is stoichiometrically related to the chromium content to provide carbides based on the formula $M_7C_3$ in which M comprises essentially chromium.

As will be appreciated, various fluxes may be incorporated with the metallic powder in the nickel tube. The ultimate rod may be drawn through a finishing die to compact it and make it uniform in content. The finished tube 10 is shown in FIG. 1 with a powder mix 11 of chromium, carbon and tungsten to provide with the nickel tube an ultimate composition containing 30% Cr, 2.4% C, 5% W and the balance essentially nickel. Some nickel powder may be present with the powder mix as an aid to compaction during tube drawing, the amount of nickel being correlated with the nickel in the tube to provide the desired total nickel in the weld deposit. As will be noted, the tube is pinched at opposite ends 12, 13.

Another weld consumable, comprising a hard facing flux-coated electrode 14, is shown in FIGS. 2 and 3. Such electrodes are disclosed in U.S. Pat. No. 3,211,582, also incorporated herein by reference. Referring to FIG. 2, a weld rod 14 is depicted comprising a core 15 of the alloy coated with a flux 16, the flux coating incorporating active fluxing agents well known in the art (note U.S. Pat. No. 3,211,582). The flux coating 16 is shown in FIG. 3 surrounding core rod 15.

The alloy of the invention is also useful as a flame-spray powder for producing coatings on metal substrates. The powder is preferably formed by atomizing a molten bath of the alloy to produce flame-spray powder in the desirable size range. Flame-spraying torches are disclosed in U.S. Pat. Nos. 3,226,028 and 3,228,610. In employing the alloy powder of the invention, the metal substrate (e.g. steel) is first cleaned in the usual manner and the powder sprayed thereon and thereafter fused in place by directing the flame of a torch onto the deposited coating.

In producing a valve seat on a valve part, a P/M preform 17 may be employed of the type shown in FIG. 4. A powder of the alloy composition may be employed in producing the compact. It may be desirable to use elemental powders in producing the preform since nickel per se is ductile and provides a compact of good green strength. Or, if desired, an alloy powder deficient in nickel may be employed and nickel powder sufficient to complete the desired composition mixed with the alloy powder to provide the necessary green strength in producing the P/M preform of FIG. 4. The preform is placed on the seat of the valve and torch-fused in place using the usual fluxes employed for that purpose to assure a metallurgical bond to the valve surface.

FIG. 5 shows a machined cast bushing or sleeve 18 which may be produced from the alloy of the invention. The foregoing casting is preferably produced by centrifugal casting. The casting is produced by pouring molten metal into a hollow carbon or steel cylindrical mold which spins about its own axis. Rapid chilling combined with the centrifugal force produces a fine grained structure and also produces metallic carbides which are fine and uniform. Such a product provides markedly superior wear and corrosion resistance.

As stated earlier, the composition can be made particularly acid resistant by adding thereto at least one of the metals selected from the group consisting of up to about 5% Cu and up to about 5% Mo, the amount of Mo added replacing equivalent amounts of tungsten. Preferably, both metals may be present in amounts ranging from about 1% to 4% Cu and 1% to 4% Mo.

A preferred alloy is one containing about 30% Cr, about 2 to 5% Si, about 2.4% C, about 5% W and the balance essentially nickel (e.g. about 58% to 61%). As stated herein, the stoichiometric relationship in producing the $M_7C_3$ compound is important, especially at or near the eutectic melting point of the alloy, in that a narrow liquidus-solidus temperature range is obtained, such as 1220° C. to 1300° C. at 2% Si and 2% C and 1230° C. to 1280° C. at 5% Si and 2% C. The narrow liquidus-solidus temperature range is desirable in that it minimizes segregation in a casting and in hard facing coatings produced from the alloy. The melting point of the alloy is less than 1350° C. and generally does not exceed 1300° C.

In nuclear applications, it is important that the alloy be iron-free, cobalt-free and boron-free. Thus, the iron and cobalt contents each should not exceed about 0.2% by weight and boron maintained below 0.1%.

Examples of alloy compositions of the invention are given as follows:

| Alloy No. | % Cr | % C | % Si | % W | % Cu | % Mo | % Ni |
|---|---|---|---|---|---|---|---|
| 1 | 20.0 | 1.7 | 2.0 | — | — | — | 76.3 |
| 2 | 25.0 | 2.0 | 1.0 | 4.0 | — | — | 68.0 |
| 3 | 25.0 | 2.2 | 2.5 | — | 2 | 2 | 66.3 |
| 4 | 30.0 | 2.4 | 2.0 | 5.0 | — | 2 | 58.6 |
| 5 | 30.0 | 3.0 | 5.0 | — | — | — | 62.0 |
| 6 | 35.0 | 3.0 | 2.0 | — | 3 | 3 | 53.5 |
| 7 | 30.0 | 2.0 | 2.0 | 8.0 | — | — | 58.0 |
| 8 | 28.0 | 2.6 | 1.5 | — | 1 | 1 | 65.9 |

About 10 parts by weight of chromium combines with about 1 part by weight of carbon to form $Cr_7C_3$. Thus, in Alloy No. 1, about 85% of the total chromium is reactable with the carbon, the remaining chromium going into solid solution with the nickel. In Alloy No. 2, about 80% of the chromium is reactable with the carbon, the remainder entering into solid solution with the nickel. In Alloy No. 7, about 66% of the chromium is combinable with the carbon, the remainder entering into solid solution with the nickel. In Alloy No. 8, about 93% of the chromium is combinable with the carbon. However, as stated hereinbefore, variations of $M_7C_3$ may form with chromium as the essential ingredient together with small amounts of tungsten and/or molybdenum, when present.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A weld rod consisting essentially of a nickel tube with a metallic powder contained within said tube, such that a melt produced therefrom consists essentially of a nickel-base wear and corrosion resistant alloy containing by weight about 20% to 35% Cr, about 1% to 8% Si, about 1.7% to 3.5% C, 0 to 15% W and the balance essentially at least about 40% nickel, the amount of carbon present being stoichiometrically related to the chromium content to provide carbides based on the formula $M_7C_3$, wherein M comprises essentially chromium, the amount of chromium in said $M_7C_3$ compound ranging from about 65% to less than about 100% of the total chromium content in said composition, the melting point of said alloy being less than about 1350° C. said alloy having a composition such that segregation of said alloy upon changing from the molten to the solid state is substantially inhibited.

2. The weld rod of claim 1, wherein the nickel-base composition also contains at least one additional metal selected from the group consisting of up to about 5% Cu and up to 5% Mo, said Mo replacing a corresponding amount of W, said nickel content being at least about 50% by weight.

3. The weld rod of claim 2, wherein the nickel-base alloy is particularly acid resistant and contains about 1% to 4% Cu and about 1% to 4% Mo.

* * * * *